United States Patent [19]
Hochman et al.

[11] Patent Number: 6,011,843
[45] Date of Patent: Jan. 4, 2000

[54] METHOD AND APPARATUS FOR INITIATING PARALLEL CONNECTIONS TO IDENTIFIED PLURAL SITES

[75] Inventors: David Charles Hochman, Nicamie; Richard Ukeno, San Francisco, both of Calif.

[73] Assignee: Harris Corporation, Melbourne, Fla.

[21] Appl. No.: 08/677,943

[22] Filed: Jul. 10, 1996

[51] Int. Cl.[7] .................................................. H04M 3/42
[52] U.S. Cl. ........................ 379/211; 379/201; 379/93.24
[58] Field of Search ................................... 379/210, 211, 379/212, 201, 207, 93.24

[56] References Cited

U.S. PATENT DOCUMENTS

| | | | |
|---|---|---|---|
| 4,796,293 | 1/1989 | Blinken et al. | 379/202 |
| 5,206,901 | 4/1993 | Harlow et al. | 379/211 |
| 5,329,578 | 7/1994 | Brennan et al. | 379/201 |
| 5,548,636 | 8/1996 | Bannister et al. | 379/201 |
| 5,557,660 | 9/1996 | Crevits et al. | 379/211 |
| 5,604,788 | 2/1997 | Tett | 379/93.24 |
| 5,668,862 | 9/1997 | Bannister et al. | 379/201 |
| 5,689,555 | 11/1997 | Sonnenberg | 379/220 |
| 5,706,339 | 1/1998 | Eisdorfer et al. | 379/211 |
| 5,757,901 | 5/1998 | Hiroshige | 379/210 |
| 5,802,160 | 9/1998 | Kugell et al. | 379/211 |
| 5,867,495 | 2/1999 | Elliott et al. | 370/352 |

*Primary Examiner*—Krista Zele
*Assistant Examiner*—Benny Q. Tieu
*Attorney, Agent, or Firm*—Allen, Dyer, Doppelt, Milbrath & Gilchrist, P.A.

[57] ABSTRACT

A method for routing a call to a called party who may be located at any one of plural sites which avoids delays in connecting the called party to the received call. When a call is received at a switch, a controller at the switch uses an embedded data base to identify plural sites where the called party may be located from among a multiplicity of sites to which the switch can be connected and causes the switch to initiate parallel connections from the switch to the identified sites. The received telephone call is routed through the switch to a one of the sites at which the called party responds to the initiated connections, and the initiated connections from the switch to the other of the identified plural sites are thereafter disestablished.

11 Claims, 1 Drawing Sheet

METHOD AND APPARATUS FOR INITIATING PARALLEL CONNECTIONS TO IDENTIFIED PLURAL SITES

BACKGROUND OF THE INVENTION

The present invention relates to routing communications to parties who may be located at any one of plural sites, and more particularly to a method of routing a received telephone call in parallel to sites at which a called party may be located to avoid delays in connecting the called party to the received call.

Busy individuals, especially those in companies with several work sites and/or who want to be contacted at home or office, would like to be connected to an incoming telephone call directed to them as quickly as possible. However, when the individual may be located at any one of plural sites the delays in connecting the individual to the call, if the connection can made at all, can be significant. For example, a message service or receptionist can take an incoming call and transfer it to the individual if the individual's location is known. If the location is not known, separate calls may be placed sequentially to each location where the individual may be located. The time delays inherent in this method are obvious.

Accordingly, it is an object of the present invention to provide a novel method for routing a call to a called party who may be located at any one of plural sites which avoids delays in connecting the called party to the received call and thereby obviates the problems of the prior art.

It is another object of the present invention to provide a novel method for routing a communication to a party in which a database is searched when a communication is received in order to identify plural sites where the party may be located from among a multiplicity of sites to which the communication can be sent and in which parallel connections are initiated simultaneously to each of the identified sites.

It is yet another object of the present invention to provide a novel method for routing a call received at a switch in which a controller at the switch uses a data base to identify plural sites where the called party may be located from among a multiplicity of sites to which the switch can be connected and causes the switch to initiate parallel connections from the switch to the identified sites, in which the received call is routed through the switch to a one of the sites at which the called party responds to the initiated connections, and thereafter the initiated connections from the switch to the other of the identified plural sites are disestablished.

It is still another object of the present invention to provide a novel method for routing a communication to a party who may be located at any one of plural sites to which the communication can be sent and in which parallel connections are initiated simultaneously to each of the sites which may be any of a wireless switch connection, a mobile telephone base, an office telephone, a telephone in a manufacturing facility, an office computer, a home computer and a home telephone.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
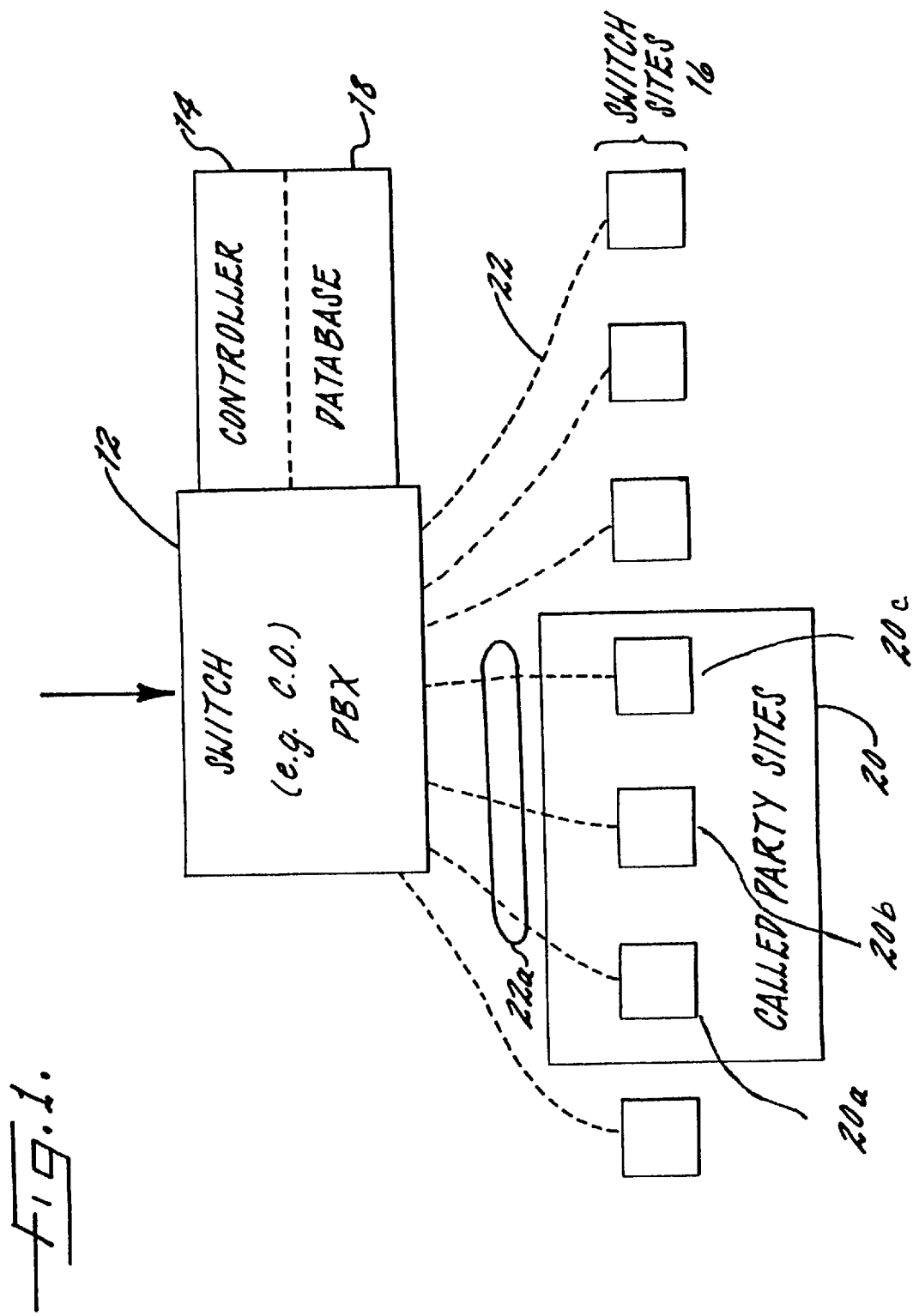
FIG. 1 is a block diagram illustrating connections in an embodiment of the present invention.

With reference now to FIG. 1, a preferred embodiment of the method of the present invention finds application in a telephone system with a switch 12 for receiving a call directed to a called party, a controller 14 for controlling where the received call is routed among a multiplicity of sites 16 to which switch 12 can be connected, and a database 18 for identifying the plural sites 20 where the called party may be located from among the multiplicity of sites 16. Connections 22 from switch 12 to sites 16 are in parallel.

In operation, a call for the called party is received at switch 12. Controller 14 searches data base 18 to identify plural sites 20 where the party may be located from among sites 16 to which switch 12 can be connected. Instructions are provided from controller 14 to switch 12 to initiate simultaneously parallel connections in the ones of lines 22 which are connected from switch 12 to the identified plural sites 16 (these are lines 22*a* in FIG. 1.) The received call is routed through switch 12 to a one of the sites 20 at which the party responds to the initiated connections on lines 22*a*. Controller 14 then verifies that the connection of the party at the one site 20 to the received call has been made through switch 12, and thereafter sends a signal from controller 14 to sites 20*b*, 20*c* to disestablish the connections between the switch and sites 20*b*, 20*c*, except the one site 20*a* to which the received call has been connected.

Switch 12 may be any conventional switching system, such as a telephone central office or a private exchange, and parallel connections 22 may also be conventional. Controller 14 may be a conventional or special purpose computer which may be programmed to provide the instructions needed for operation of switch 12 as set forth herein. Switch 12 may be provided with corresponding programming to implement the instructions. These capabilities can be provided by one of skill the art without undue effort.

Database 18 may include a cross reference of called party identifiers (e.g., information available from the incoming call directly such as telephone number called or account number, or information which may be requested from the calling party, such as letters of last name or a prearranged code) to a list of sites 20 where the called party can be connected to switch 12. Sites 20 may be any appropriate location for a communication such as a wireless switch connection (which communicates by wireless devices with a portable telephone carried by the called party), a mobile telephone base (which communicates with mobile sites such as a car phone), an office telephone, a telephone in a manufacturing facility, an office computer, a home computer, a home telephone, etc. Each called party may have a unique telephone number, serial number or system identifier to ensure that only one instrument will be capable of answering the incoming call at a site.

Database 18 is desirably accessible by telephone or conventional data input device so that a called party can update the list of possible sites where connections can be made. The sites may be identified by code to facilitate changes.

While the preferred embodiment relates to telephone calls, it is to be understood that the invention is applicable to other forms of communication such as e-mail and the like.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for routing a communication to a party who may be located at any one of plural sites, the method comprising the steps of:

(a) receiving a communication for the party at a switch;

(b) at the same switch, obtaining information on the communication;

(c) at a controller positioned at the same switch, searching a database responsive to the obtained information to identify plural sites where the party may be located from among a multiplicity of sites to which the same switch can be connected, the data base including a called party identifier to ensure that only one of the identified plural sites will answer the received communication;

(d) providing instructions from the controller to the same switch to initiate parallel connections from the same switch to the identified plural sites;

(e) in response to the initiated parallel connections, receiving a response by the party from one of the identified plural sites;

(f) routing the received communication through the same switch to the site at which the party responded to the initiated connections;

(g) verifying at the controller that the connection of the same switch to the site at which the party has responded has been made; and (h) sending a signal from the controller to the identified sites for disestablishing the connections between the same switch and all of the sites except the site at which the party has responded.

2. The method of claim 1 wherein the communication is a telephone call.

3. The method of claim 1 wherein the communication is an electronic mail transmission.

4. The method of claim 1 wherein the step of obtaining information on the communication includes the step of obtaining an identifier of the called party from the communication.

5. The method of claim 1 wherein the step of obtaining information on the communication includes the step of providing identity information on the source of the communication.

6. The method of claim 1 further comprising the step of providing a unique communication address for the party at each site for routing the communication only to the party.

7. In a switch having a controller and a data base identifying a multiplicity of sites to which the switch can be connected, means for routing a received communication to a party who may be located at any one of plural sites comprising:

means for obtaining information on the received communication;

means for searching the data base responsive to the obtained information to identify plural sites where the party may be located from among the identified plural sites to which the same switch can be connected, the data base including a called party identifier to ensure that only one of the multiplicity of sites will answer the received communication;

means for providing instructions from the controller to the same switch to initiate parallel connections from the switch to each of the identified plural sites;

means for detecting a response by the party from one of the identified plural sites;

means for routing the received communication through the same switch to the site at which the party has responded;

means for verifying at the controller that the connection of the same switch to the site at which the party has responded has been made; and means for sending a signal from the controller to the identified sites for disestablishing the connections between the same switch and all of the sites except the site at which the party has responded.

8. The switch of claim 7 wherein the communication is a telephone call.

9. The switch of claim 7 wherein the communication is an electronic mail transmission.

10. The switch of claim 7 wherein the means for obtaining information includes a means for obtaining an identifier of the called party from the communication.

11. The switch of claim 7 wherein the means for obtaining information includes a means for providing identity information on the source of the communication.

* * * * *